No. 848,268. PATENTED MAR. 26, 1907.
C. L. SMITH.
MEANS FOR PREVENTING THE ESCAPE OF NOXIOUS VAPORS AND GASES FROM RENDERING TANKS INTO THE ATMOSPHERE.
APPLICATION FILED AUG. 25, 1906.
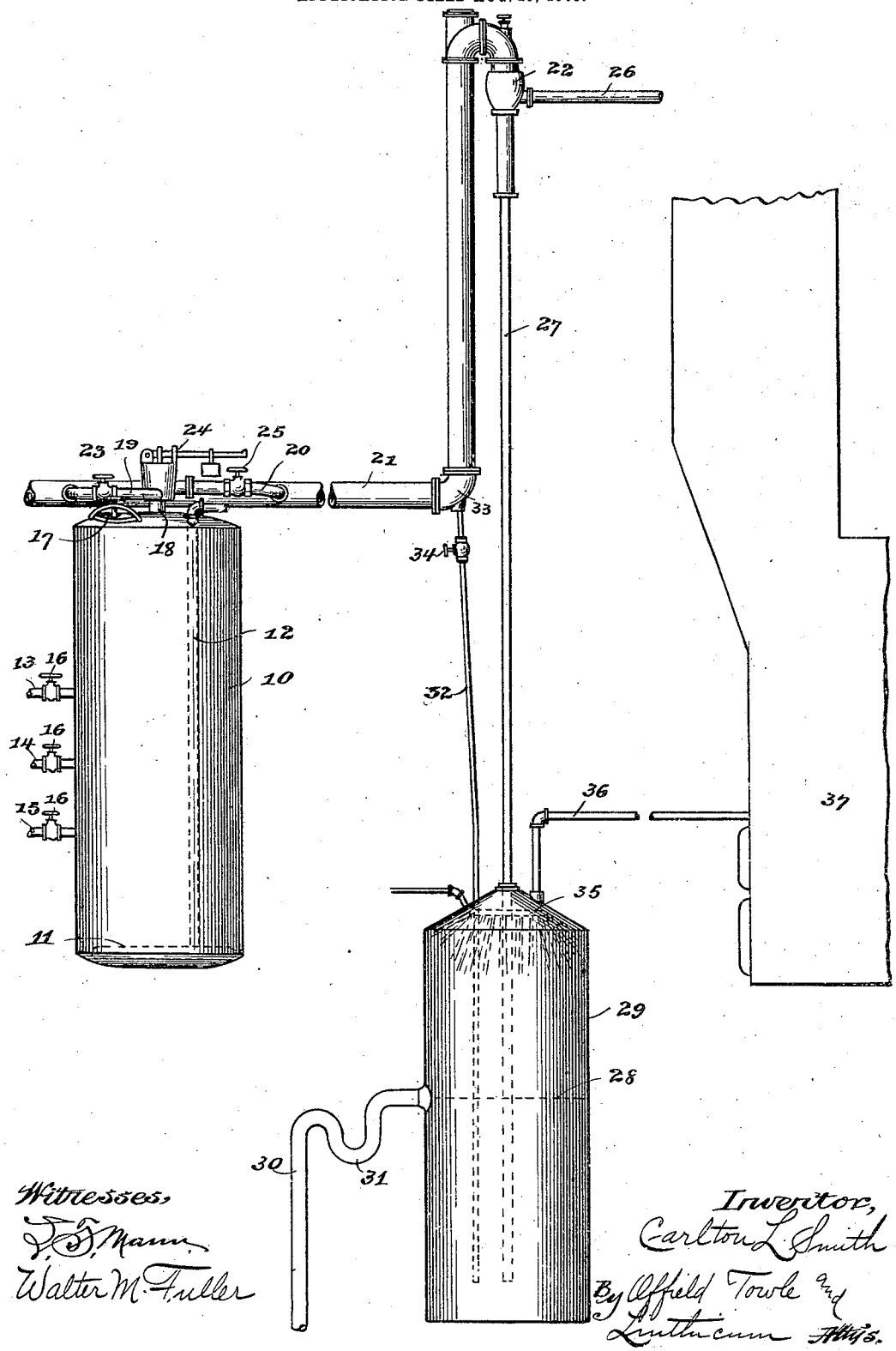

UNITED STATES PATENT OFFICE.

CARLTON L. SMITH, OF CHICAGO, ILLINOIS, ASSIGNOR TO ARMOUR & COMPANY, OF CHICAGO, ILLINOIS, A CORPORATION OF ILLINOIS.

MEANS FOR PREVENTING THE ESCAPE OF NOXIOUS VAPORS AND GASES FROM RENDERING-TANKS INTO THE ATMOSPHERE.

No. 848,268.          Specification of Letters Patent.          Patented March 26, 1907.

Application filed August 25, 1906. Serial No. 332,064.

*To all whom it may concern:*

Be it known that I, CARLTON L. SMITH, a citizen of the United States, residing at Chicago, in the county of Cook and State of Illinois, have invented certain new and useful Improvements in Means for Preventing the Escape of Noxious Vapors and Gases from Rendering-Tanks into the Atmosphere, of which the following is a specification.

My invention relates to means for doing away with the noxious vapors and gases incident to the rendering of lard or offal, or at least preventing their escape into and contamination of the open air.

Lard is rendered by placing the leaves or crude material in a large tank, tightly closing the same, and subjecting the contents to the action of steam at approximately forty-pounds pressure for about eight hours. This treatment causes the formation and accumulation in the top of the tank of vapors or gases the foul odor of which it is desirable, in fact practically necessary, to prevent escaping into the atmosphere. Municipal ordinances require that such gases or vapors must be led away from the tank and discharged through a water seal to condense them; but it has been found that the use of such a water seal creates sufficient back pressure so that after the supply of steam has been cut off and the pressure in the tank reduced when the tank is opened more or less of the disagreeable vapors escape into the building and find their way into the outer air. In order to comply with the municipal requirements concerning such a water seal, which acts as a condenser, and at the same time do away with the objectionable back pressure, I have conceived the use of a condenser between the tank and water seal, which preferably works intermittently and condenses a large part of the objectionable vapors or gases. By using such a condensing means when the lard-tank is opened up, the admission of steam thereto having ceased and the steam previously therein having been drawn over to the condenser and condensed, instead of the repulsive vapors and gases passing into the air and belching into the workmen's faces the exterior air is drawn into the tank, because of the vacuum or partial vacuum in the tank and pipes created by the condenser. The liquid in the water-seal tank acts as an additional or supplemental condenser, its water, as well as that of the main condenser and the condensed vapors, passing through an overflow-pipe equipped with an ordinary trap to the sewer, while any non-condensable gases are drawn off to a furnace and burned or otherwise destroyed.

In the accompanying drawing, which forms a part of this specification, I have illustrated the preferred embodiment of my invention.

The tank 10, which is used for rendering lard or offal, has resting on its bottom a perforated pipe bent or shaped to form a ring 11, with which communicates the steam-supply pipe 12, passing off through the top of the tank, as shown. On its side this rendering-tank 10 is equipped with three spaced pipes 13, 14, and 15, each provided with a controlling-valve 16, the object and purpose of these pipes being to withdraw the rendered or melted and bleached lard from the tank at three different levels after it has been properly treated, thereby producing three different grades of the finished product. On its top tank 10 has a manhole 17, provided with the usual form of closure. Leading from the center of the top of this rendering-tank is a pipe 18, which has two branches 19 and 20, communicating with a pipe 21, leading to a siphon-condenser 22. The branch pipe 19 is supplied with an ordinary hand-controlled valve 23, while the branch pipe 20 has a safety-valve 24 of the usual construction, as well as a hand-valve 25. The siphon-condenser 22 is of the customary form and is equipped with a pipe 26 for conveying the condensing-water to the same, while the lower portion of the condenser is supplied with a pipe 27, which extends below the level of the water 28 in a water-seal tank 29, preferably placed directly below the condenser.

In order to maintain a uniform level and prevent an accumulation of water in tank 29, the latter is equipped with an overflow-pipe 30, having a trap 31 leading to the sewer. I also provide a small drain-pipe 32, which at its upper end is connected with the lowest portion of pipe 21, in the present instance being associated with the elbow 33 and having its lower end extended below the surface of the water 28, as is the pipe 27.

This drain-pipe, which is only used occasionally, is supplied with a valve 34, so that it may remain normally closed.

Since some of the noxious vapors or gases may possibly pass through the siphon-condenser 22 and through the water seal of tank 29 without being condensed, I provide a water-spray 35 in the top part of tank 29 above the water, the spray operating as an additional condensing means.

Some of the vapors or gases from the tank are ordinarily not condensable, and it becomes necessary to destroy them in some other way. To accomplish this result, I provide the top part of tank 29 with a vent-pipe 36, which leads to a furnace 37, wherein the non-condensable gases are consumed and destroyed by the hot gases of the furnace either in the uptake or in the chimney itself.

The operation of my improved condensing means for use in connection with rendering-tanks or similar appliances is substantially as follows: The closure having been removed from the aperture or manhole 17, the material to be rendered is fed to the tank through the aperture, and after a sufficient quantity has been placed therein the closure is tightly placed over the aperture, so as to seal the tank hermetically. Steam at approximately forty pounds pressure is then admitted to the tank through the pipe 12 and ring 11, and the rendering process begins and continues for approximately eight hours. During this cooking or rendering of the contents of the tank all of the valves 16 remain closed, and the valve 23 also closes its branch-pipe connection 19, while the hand-valve 25 in branch 20 remains open, whereby the passage through this branch is governed entirely by the safety-valve 24, whose controlling-arm is weighted sufficiently so that the valve will open at approximately forty pounds pressure. The supply of steam from the pipe 12 is so controlled that safety-valve 24 intermittently opens and closes branch 20, whereby small quantities of the noxious vapors and gases which rise to the top of the tank are permitted at intervals to pass through the pipe 21 to the condenser 22, where they are largely, if not wholly, condensed by reason of coming in contact with the condensing-water, which is fed to the condenser through pipe 26. It will be readily understood that this condensation of the vapors or gases causes a complete or partial vacuum, so that the moment the safety-valve opens the gases at the top of the tank are sucked or drawn through pipe 21 to the condenser, where they in turn are condensed and form a vacuum which draws over other gases and vapors. The condensed gases or vapors and the condensing-water flow down pipe 27, at the same time entraining any non-condensable gases, and possibly some condensable gases, carrying them to the lower tank 29. The condensed gases or vapors and condensing-water after they reach the tank 29 pass through the overflow-pipe 30 and trap 31 to the sewer, a portion of the entrained gases being also condensed by the water forming the water seal in the lower part of the tank 29. Even with this construction some condensable gases and all the non-condensable gases reach the upper part of tank 29, where they are subjected to the water-spray furnished by pipe 35. This in turn condenses or liquefies any of the gases or vapors which are subject to such condensation, while the non-condensable gases or vapors are sucked through the vent-pipe 35 because of the draft of furnace 37, and when they reach the furnace they are immediately consumed or burned, so that all the condensable and non-condensable noxious gases and vapors which are formed by the operation of the rendering-tank are satisfactorily disposed of. Because of the vacuum created it is necessary to place condenser 22 about thirty feet above the water-level in tank 29, and the pipe 27 is partially, or almost wholly, filled with water, due to the pressure of the atmosphere, as will be readily understood; but such presence of water in this pipe does not prevent the condensed gases and vapors, the condensing-water, and the entrained gases from passing down into the water-seal tank 29. When the rendering process is to be stopped, the supply of steam to tank 10 is cut off, the workman opens valve 23, permitting all of the vapors, gases, and steam to pass to the condenser, and then opens up the manhole 17. No disagreeable or objectionable gases issue from the manhole; but, instead, more or less external air is drawn into the tank because of a less than atmospheric pressure therein. Cold water is admitted to the tank, which raises the liquid lard sufficiently to permit its being drawn off at three different levels through pipes 13, 14, and 15.

To those skilled in the art it will be apparent that various minor changes may be made in the apparatus or in the method used for ridding a rendering plant of its noxious odors without departing from the substance or sacrificing the beneficial features of my invention, as described above and illustrated in the drawings.

Other condensers than a siphon-condenser might be used successfully, and in actual operation I employ a bank of rendering-tanks piped to a single condenser and a single water-seal tank.

By using two condensers and a single water-seal tank rendering-tanks for lard and offal may be operated at the same time without the one affecting the other.

I claim—

1. In a device of the character described, the combination of a rendering-tank, a condenser, means for conveying condensing-water thereto, a pipe connecting said rendering-tank and condenser to conduct noxious vapors and gases from the former to the latter, a tank provided with a water seal, and a pipe forming the sole outlet of said condenser directly connecting said condenser to said water-seal tank and extending below the surface of the water therein, said pipe conducting the condensing-water, the condensed vapors and gases, and the entrained vapors and gases from said condenser to said water-seal tank below the surface of its water, substantially as described.

2. In a device of the character described, the combination of a rendering-tank, a condenser, means for conveying condensing-water thereto, a pipe connecting said rendering-tank and condenser to conduct noxious vapors and gases from the former to the latter, a tank provided with a water seal, the surface of the water in said tank being lower than said condenser, and a pipe forming the sole outlet of said condenser directly connecting said condenser to said tank and extending below the surface of the water therein, said pipe conducting the condensing-water, the condensed vapors and gases, and the entrained vapors and gases from said condenser to said water-seal tank below the surface of its water, substantially as described.

3. In a device of the character described, the combination of a rendering-tank, means for supplying steam thereto, a siphon-condenser, means for conveying condensing-water thereto, a pipe connecting said rendering-tank and condenser to conduct noxious vapors and gases from the former to the latter, a tank provided with a water seal, the surface of the water in said tank being lower than said condenser, a pipe forming the sole outlet of said condenser directly connecting said condenser to said tank and extending below the surface of the water therein, said pipe conducting the condensing-water, the condensed vapors and gases and the entrained vapors and gases from said condenser to said water-seal tank below the surface of its water, and a vent communicating with said water-seal tank above the surface of its water to convey away the non-condensable vapors and gases for destruction, substantially as described.

4. In a device of the character described, the combination of a rendering-tank, means for supplying steam thereto, a siphon-condenser, means for conveying condensing-water thereto, a pipe connecting said rendering-tank and condenser to conduct noxious vapors and gases from the former to the latter, a tank provided with a water seal, a pipe forming the sole outlet of said condenser connecting said condenser to said tank and extending below the surface of the water therein, the surface of the water in said water-seal tank being lower than said condenser an amount at least equivalent to the height of a column of water corresponding to the maximum vacuum produced in said condenser, said latter pipe conducting the condensing-water, the condensed vapors and gases and the entrained vapors and gases from said condenser to said water-seal tank below the surface of its water, and a discharge-pipe connected with said water-seal tank which maintains the water-level therein substantially constant, substantially as described.

5. In a device of the character described, the combination of a rendering-tank, means for supplying steam thereto, a siphon-condenser, a pipe for conveying condensing-water to said condenser, a pipe connecting said rendering-tank with said condenser to conduct noxious vapors and gases from the former to the latter, means in said latter pipe for intermittently opening and closing said pipe, a water-seal tank adapted to contain a supply of water, and a pipe connected to said condenser and extending below the surface of the water in said water-seal tank, said latter pipe being adapted to discharge the condensing-water of the condenser, the condensed vapors or gases, and entrained vapors or gases into said water-seal tank, substantially as described.

6. In a device of the character described, the combination of a rendering-tank, means to supply steam thereto, a siphon-condenser, means for conveying condensing-water thereto, a pipe connecting said tank and condenser to conduct noxious vapors and gases from the former to the latter, a safety-valve associated with said pipe controlling the passage therethrough, a water-seal tank adapted to contain a supply of water, an overflow-pipe connected to said water-seal tank through which a surplus of water or condensed vapors or gases in said water-seal tank may pass, and a pipe connected to said condenser and extending below the surface of the water in said water-seal tank, said latter pipe being adapted to discharge the condensing-water of the condenser, the condensed vapors or gases, and entrained vapors or gases into said water-seal tank, substantially as described.

7. In a device of the character described, the combination of a rendering-tank, means to supply steam thereto, a siphon-condenser, a pipe to convey condensing-water thereto, a pipe connecting said tank and condenser and adapted to convey noxious vapors and gases from the tank to the condenser, a water-seal tank lower than said condenser and adapted to contain a supply of water, a pipe communicating with said condenser and extending below the surface of the water in said water-seal tank, said latter pipe being adapted to discharge the condensing-water of the condenser, the condensed vapors or gases, and entrained vapors or gases into said water-seal tank, a vent-pipe communicating with said water-seal tank above the surface of its water to convey away the vapors and gases which have not been condensed, and means in the upper part of said water-seal tank for spraying the vapors or gases therein with water to condense those subject to condensation, substantially as described.

8. In a device of the character described, the combination of a rendering-tank, means for supplying steam thereto, a siphon-condenser, a pipe for conveying condensing-water thereto, a valve-controlled pipe connecting said tank and condenser and adapted to convey noxious vapors and gases from said tank to said condenser, a water-seal tank below said condenser, an overflow-discharge pipe connected to said water-seal tank to convey away a surplus of liquid therein, a pipe connected to said condenser and extending below the surface of the water in said water-seal tank, said latter pipe being adapted to discharge the condensing-water of the condenser, the condensed vapors or gases, and the entrained vapors or gases into said water-seal tank, a vent-pipe connected to said water-seal tank to carry away vapors or gases which have not been condensed, and means for spraying with water the gases in said water-seal tank above the water therein, substantially as described.

9. In a device of the character described, the combination of a rendering-tank, means for supplying steam thereto, a siphon-condenser, a pipe having two branches connecting said tank and condenser to conduct noxious vapors and gases from the former to the latter, a safety-valve in one of said branches, a manually-controlled valve in the other branch, a water-seal tank, an overflow-pipe communicating with said latter tank and determining the height of water therein, a trap in said overflow-pipe, a pipe connected to said condenser and extending below the surface of the water in said water-seal tank, means for supplying a water-spray within said water-seal tank above the water therein, and a vent-pipe connected to the upper part of said water-seal tank for conveying away the non-condensed vapors or gases, substantially as described.

As evidence that I claim the foregoing as my invention I have signed the same this 20th day of August, 1906, in the presence of two witnesses.

CARLTON L. SMITH.

Witnesses:
ABRAM B. STRATTON,
LEON J. POTTER.